US009388513B2

(12) United States Patent
Strachan et al.

(10) Patent No.: US 9,388,513 B2
(45) Date of Patent: *Jul. 12, 2016

(54) CRYSTALLOGRAPHICALLY-ORIENTED CARBON NANOTUBES GROWN ON FEW-LAYER GRAPHENE FILMS

(75) Inventors: Douglas Robert Strachan, Lexington, KY (US); David Patrick Hunley, Lexington, KY (US)

(73) Assignee: The University of Kentucky Research Foundation, Lexington, KY (US)

(*) Notice: Subject to any disclaimer, the term of this patent is extended or adjusted under 35 U.S.C. 154(b) by 981 days.

This patent is subject to a terminal disclaimer.

(21) Appl. No.: 13/538,326

(22) Filed: Jun. 29, 2012

(65) Prior Publication Data
US 2013/0000961 A1    Jan. 3, 2013

Related U.S. Application Data

(60) Provisional application No. 61/571,764, filed on Jul. 1, 2011.

(51) Int. Cl.
B32B 9/04       (2006.01)
D01F 9/127      (2006.01)
B82Y 30/00      (2011.01)
B82Y 40/00      (2011.01)
C01B 31/02      (2006.01)

(52) U.S. Cl.
CPC ............ D01F 9/127 (2013.01); B82Y 30/00 (2013.01); B82Y 40/00 (2013.01); C01B 31/0226 (2013.01)

(58) Field of Classification Search
USPC .......................................... 428/688, 408, 409
See application file for complete search history.

(56) References Cited

U.S. PATENT DOCUMENTS

| 7,449,133 | B2 | 11/2008 | Gruner et al. | |
| 7,537,682 | B2 | 5/2009 | Dailly et al. | |
| 7,776,445 | B2 | 8/2010 | Lee et al. | |
| 7,842,387 | B2 | 11/2010 | Resasco et al. | |
| 7,988,941 | B2* | 8/2011 | Choi et al. | 423/448 |
| 8,057,863 | B2 | 11/2011 | Liang | |
| 8,597,526 | B2* | 12/2013 | Jiang et al. | 216/20 |
| 8,709,373 | B2* | 4/2014 | Hauge et al. | 423/447.1 |
| 8,900,390 | B2* | 12/2014 | Jiang et al. | 156/155 |
| 8,920,661 | B2* | 12/2014 | Jiang et al. | 216/13 |
| 8,999,820 | B2* | 4/2015 | Byun et al. | 438/478 |
| 2004/0071870 | A1* | 4/2004 | Knowles et al. | 427/200 |
| 2007/0284557 | A1* | 12/2007 | Gruner et al. | 252/500 |
| 2008/0317660 | A1* | 12/2008 | Pan et al. | 423/447.2 |
| 2009/0174435 | A1* | 7/2009 | Stan | B82Y 10/00 326/112 |
| 2009/0186214 | A1* | 7/2009 | Lafdi et al. | 428/336 |

(Continued)

FOREIGN PATENT DOCUMENTS

WO   WO2009149005   * 12/2009

OTHER PUBLICATIONS

Yi et al. ("Highly oriented planar arrays of SWCNTs grown onto HOPG substrates by means of an 'all-laser' process", Chem. Phys. Lett. 413 (2005) 182-187).*

(Continued)

Primary Examiner — Lauren R Colgan
(74) Attorney, Agent, or Firm — King & Schickli, PLLC

(57) ABSTRACT

A thermal and electrical conducting apparatus includes a few-layer graphene film having a thickness D where D≤1.5 nm and a plurality of carbon nanotubes crystallographically aligned with the few-layer graphene film.

7 Claims, 11 Drawing Sheets

(56) References Cited

U.S. PATENT DOCUMENTS

| | | | |
|---|---|---|---|
| 2009/0200707 A1 | 8/2009 | Kivioja et al. | |
| 2009/0226361 A1* | 9/2009 | Campos-Delgado | B82Y 30/00 423/447.2 |
| 2009/0272935 A1 | 11/2009 | Hata et al. | |
| 2009/0278556 A1* | 11/2009 | Man et al. | 324/693 |
| 2010/0021708 A1* | 1/2010 | Kong et al. | 428/220 |
| 2010/0028613 A1* | 2/2010 | Schmidt et al. | 428/172 |
| 2010/0085713 A1 | 4/2010 | Balandin et al. | |
| 2010/0105834 A1* | 4/2010 | Tour | B82Y 30/00 525/50 |
| 2010/0159366 A1* | 6/2010 | Shao-Horn et al. | 429/532 |
| 2010/0200208 A1 | 8/2010 | Cola et al. | |
| 2010/0212727 A1 | 8/2010 | Lee | |
| 2010/0247801 A1 | 9/2010 | Zenasni | |
| 2010/0255984 A1* | 10/2010 | Sutter et al. | 502/185 |
| 2010/0272917 A1* | 10/2010 | Haque | H01B 1/04 427/526 |
| 2011/0014368 A1 | 1/2011 | Vasenkov | |
| 2011/0017585 A1 | 1/2011 | Zhamu et al. | |
| 2011/0027162 A1* | 2/2011 | Steiner et al. | 423/440 |
| 2011/0114894 A1* | 5/2011 | Choi et al. | 252/503 |
| 2011/0206934 A1 | 8/2011 | Bol et al. | |
| 2012/0034707 A1* | 2/2012 | Datta et al. | 436/501 |
| 2012/0192931 A1* | 8/2012 | Jeon et al. | 136/252 |
| 2012/0251764 A1* | 10/2012 | Jiang et al. | 428/113 |

OTHER PUBLICATIONS

Wang et al. ("Ni induced few-layer graphene growth at low temperature by pulsed laser deposition" AIP Advanced 1, 022141 (2011)).*

Luca (Chirality dependent surface adhesion of single-walled carbon nanotubed on graphene surfaces, Carbon 48 (2010) 3050-3056.*

Li et al. (All-carbon Electronic Devices Fabricated by Directly Grown Single-Walled Carbon Nanotubes on Reduced Graphene Oxide Electrodes, Adv. Materials. 2010, 3058-3061).*

Lee et al. (Versitile Carbon Hybrid Films Composed of Vertical Carbon Nanotubes Grown on Mechanically Compliant Graphene Films, Adv. Materials, 2010, 22, 1247-1252).*

Kim et al. (Durable Large-Area Thin Films of Graphene/Carbon Nanotube Double Layers as a Transparent Electrode, Langmuire, 2009, 25(19), 11302-11306).*

Bhushan et al. (Handbook of Nanomaterials Properties, 2014, p. 718).*

A.K. Geim, et al.; "The rise of graphene"; Nature Materials vol. 6, pp. 183-191; Nature Publishing Group (2007).

K.S. Novoselov, et al. "Two-dimensional gas of massless Dirac fermions in graphene"; Nature vol. 438, pp. 197-200; Nature Publishing Group (2005).

K.S. Novoselov, et al.; "Electric Field Effect in Atomically Thin Carbon Films"; Science vol. 306, pp. 666-669; (2004).

Veronica Barone, et al.; "Electronic Structure and Stability of Semiconducting Graphene Nanoribbons" Nano Letters vol. 6, No. 12, pp. 2748-2754; American Chemical Society (2006).

D. Basu, et al.; "Effect of Edge Roughness on Electronic Transport in Graphene Nanoribbon Channel Metal-Oxide-Semiconductor Field-Effect Transistors"; Applied Physics Letters vol. 92, pp. 042114-1-042114-3; American Institute of Physics (2008).

Young-Woo Son, et al.; "Energy Gaps in Graphene Nanoribbons"; Physical Review Letters vol. 97, pp. 216803-1-216803-4; The American Physical Society (2006).

Denis A. Areshkin, et al.; "Ballistic Transport in Graphene Nanostrips in the Presence of Disorder: Importance of Edge Effects"; Nano Letters vol. 7, No. 1, pp. 204-210; American Chemical Society (2007).

Melinda Y. Han, et al.; "Energy Band-Gap Engineering of Graphene Nanoribbons"; Physical Review Letters vol. 98, p. 206805-1-206805-4; The American Physical Society (2007).

Akira Tomita, et al.; "An Optical Microscopic Study on Catalytic Hydrogenation of Graphite"; The Journal of Physical Chemistry vol. 78, No. 22, pp. 2254-2258 (1974).

Sujit S. Datta, et al.; "Crystallographic Etching of Few-Layer Graphene"; Nano Letters vol. 8, No. 7, pp. 1912-1915; American Chemical Society (2008).

Leonardo C. Campos, et al.; "Anisotropic Etching and Nanoribbon Formation in Single-Layer Graphene"; Nano Letters vol. 9, No. 7, pp. 2600-2604; American Chemical Society (2009).

Lijie Ci, et al.; "Controlled Nanocutting of Graphene" Nano Research vol. 1, pp. 116-122 (2008).

Sujit S. Datta; "Wetting and energetics in nanoparticle etching of graphene"; Journal of Applied Physics vol. 108, pp. 024307-1-024307-7 (2010).

Steven L. Garverick, et al.; "An MOS Device for AC Measurement of Surface Impedance with Application to Moisture Monitoring"; IEEE Transactions on Electron Devices vol. ED-29, No. 1, pp. 90-94 (1982).

Liju Yang, et al.; "Detection of viable Salmonella using microelectrode-based capacitance measurement coupled with immunomagnetic separation"; Journal of Microbiological Methods vol. 64, pp. 9-16 (2006).

Liying Jiao, et al.; "Narrow graphene nanoribbons from carbon nanotubes"; Nature vol. 458, pp. 877-880; Macmillan Publishers Limited (Apr. 16, 2009).

Dmitry V. Kosynkin, et al.; "Longitudinal unzipping of carbon nanotubes to form graphene nanoribbons"; Nature vol. 458, pp. 872-876; Macmillan Publishers Limited (Apr. 16, 2009).

Xiaolin Li, et al.; "Chemically Derived, Ultrasmooth Graphene Nanoribbon Semiconductors"; Science vol. 319, pp. 1229-1232 (Feb. 29, 2008).

Xinran Wang, et al.; "Room-Temperature All-Semiconducting Sub-10-nm Graphene Nanoribbon Field-Effect Transistors"; Physical Review Letters vol. 100, pp. 206803-1-206803-4; The American Physical Society (2008).

L.A. Ponomarenko, et al.; "Chaotic Dirac Billiard in Graphene Quantum Dots"; Science vol. 320, pp. 356-358 (Apr. 18, 2008).

* cited by examiner

CRYSTALLOGRAPHICALLY-ORIENTED CARBON NANOTUBES GROWN ON FEW-LAYER GRAPHENE FILMS

This utility patent application claims the benefit of priority in U.S. Provisional Patent Application Ser. No. 61/571,764 filed on 1 Jul. 2011, the entirety of the disclosure of which is incorporated herein by reference.

GOVERNMENT SUPPORT

This invention was made with government support under grant DMR-0805136 awarded by the National Science Foundation. The government has certain rights in the invention.

TECHNICAL FIELD

This document relates to carbon nanotube production and, more particularly, crystallographically-oriented carbon nanotubes grown on few-layer graphene film.

BACKGROUND SECTION

Carbon nanotubes (NTs) and graphene have tremendous potential for future nanoscale applications due to their remarkable physical properties, such as high carrier mobility and mechanical strength. To realize the potential of these two closely related materials, both comprising $sp^2$-bonded honeycomb structured carbon sheets, significant improvements to the crystallographic control over their construction, orientation, and placement at the nanoscale are required. Towards this goal, a number of techniques have been utilized to precisely control the orientation and placement of NTs, such as aligned growth utilizing atomic step-edge templates, single-crystal templates, flow-alignment, electric-field alignment, and combinations of the above techniques yielding novel structures such as serpentines. Yet the growth of nanotubes with specific chirality has still been a major technological obstacle. Another remaining obstacle has been the growth of nanotubes on electrically conducting substrates.

Crystallographic nanoscale control over the construction of graphene and few-layer graphene (FLG) structures has seen progress through nano-lithographic methods, crystallographic catalytic etching, etch masks made from nanowires and metallic nanojunctions, localized etching with scanning probes, ultrasonication, and plasma etching of NTs. Additional recent efforts in precision nanofabrication have been directed towards the goal of directly growing NTs from carbon sources, such as graphene oxide and reduced graphene oxide, without the need of a feedstock gas. Although NTs have been shown to have a chirality dependent adhesion to graphene, most previous investigations focused on the interactions between NTs and graphene in its bulk graphite form; with some of this work showing that NTs grown through laser ablation can be oriented along specific bulk graphite crystal axes.

This document discloses the growth of NTs on electrically conducting few-layer graphene (FLG) films using catalytic chemical vapor deposition (CVD). We find that NTs grow along specific crystallographic orientations of the FLG films. Moreover, this crystallographic orientation becomes significantly more pronounced on thinner films that are less than approximately 6 atomic layers thick. The orientations of the NTs are 30° offset from crystallographic etch directions occurring in graphene, indicating that the NTs lie along the armchair directions of the FLG lattice. A striking feature of the NTs on FLG is that they make occasional abrupt 60° or 120° changes in direction along the other armchair orientations. These abrupt changes in crystallographic direction also occur when NTs encounter one another, which is indicative of a tip-growth mechanism along the surface of the FLG.

SUMMARY SECTION

In accordance with the purposes described herein, a thermal and electrical conducting apparatus is provided comprising a few-layer graphene film having a thickness D where $D \leq 1.5$ nm and a plurality of carbon nanotubes crystallographically aligned with the few-layer graphene film. In come embodiments the few-layer graphene film is on a substrate. The substrate may be made from an insulator or a metal. In some embodiments the few-layer graphene film has a thickness D, where $D \leq 1.0$ nm. The crystallographically aligned carbon nanotubes demonstrate three distinct histogram peaks at angles of about −60°, about 0° and about +60° in relation to any of the peaks.

In accordance with an additional aspect, a method is provided for growing carbon nanotubes on a few-layer graphene film. The method comprises the steps of applying catalyst particles to a few-layer graphene film having a thickness D, where $D \leq 1.5$ nm and growing carbon nanotubes on that few-layer graphene film in crystallographic alignment with the few-layer graphene film so that the carbon nanotubes demonstrate three distinct histogram peaks at angles of about −60°, about 0° and about +60°.

The method may be further described as including the growing of the carbon nanotubes in two stages. The first stage of the two stages includes growing the carbon nanotubes at a first temperature of between about 850° C. to about 950° C. using a first rate of feedstock vapor ($R_1$) so as to promote a relatively slow growth in a first orientation along a surface of the few-layer graphene film. The second stage of the two stages includes growing the carbon nanotubes under a second set of conditions which promotes their relatively faster growth in a second orientation out of plane substantially perpendicular to the surface of the few-layer graphene film. This second set of growth parameters can include a change in temperature and/or a change in the flow rate of feedstock (such as $CH_4$ or $C_2H_4$) and carrier gases (Ar and $H_2$) compared to the first stage.

In addition the method may include removing the crystallographically aligned carbon nanotubes from the few-layer graphene film while maintaining the alignment of the carbon nanotubes.

BRIEF DESCRIPTION OF THE DRAWING FIGURES

The accompanying drawings incorporated herein and forming a part of the specification, illustrate several aspects of the present embodiments and together with the description serve to explain certain principles of those embodiments. In the drawings.

Figure 4A:
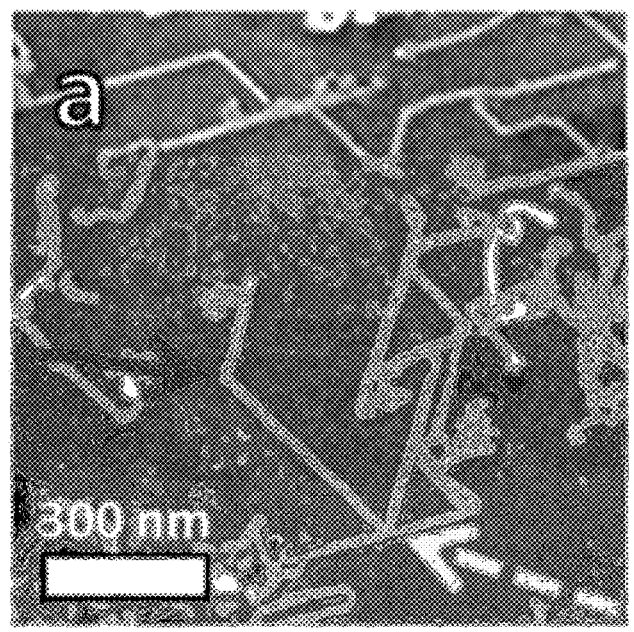
Figure 4B:
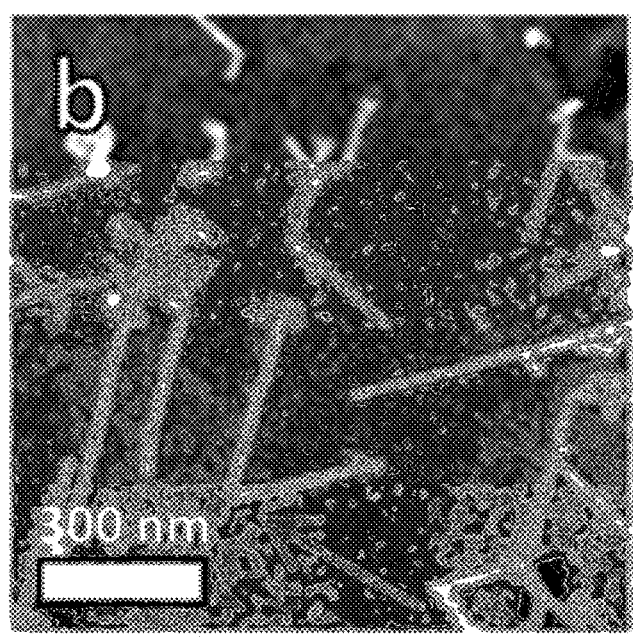
Figure 4C:
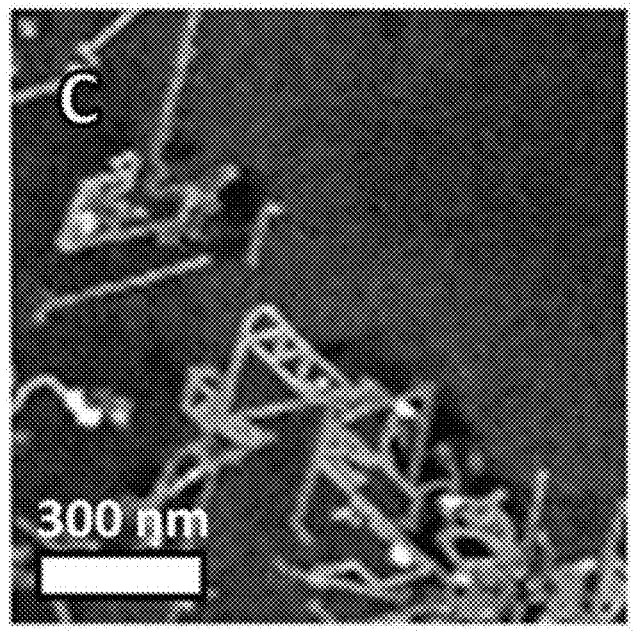
Figure 4D:
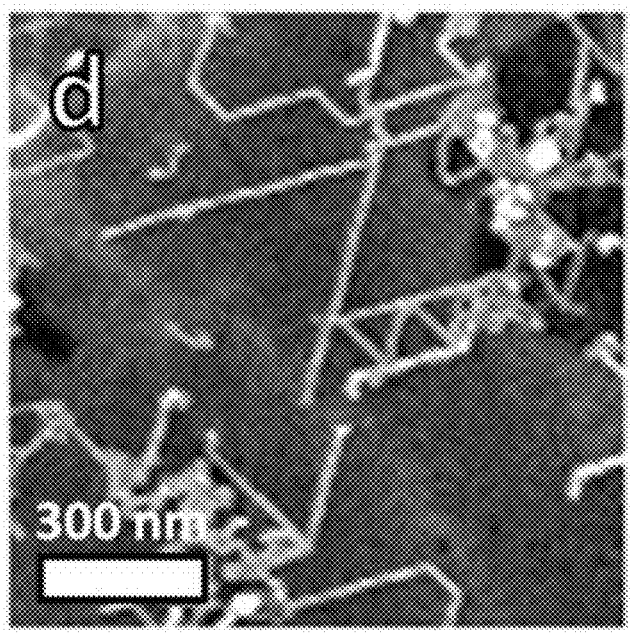
Figure 4E:
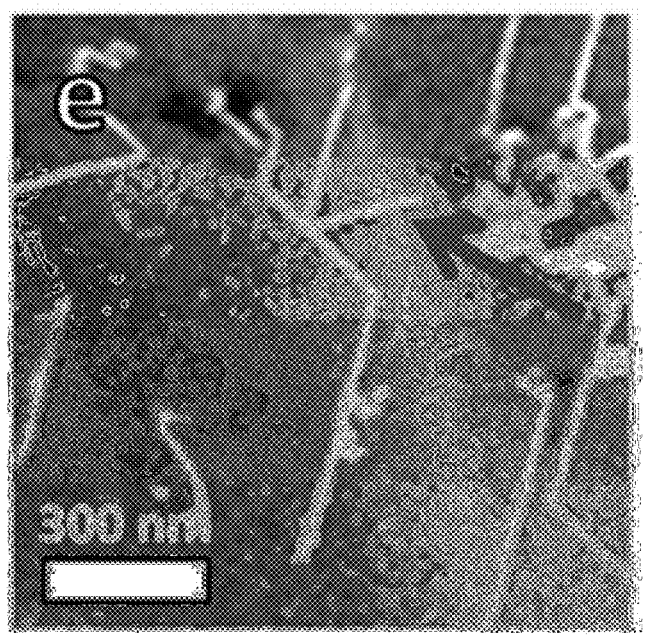
Figure 4F:
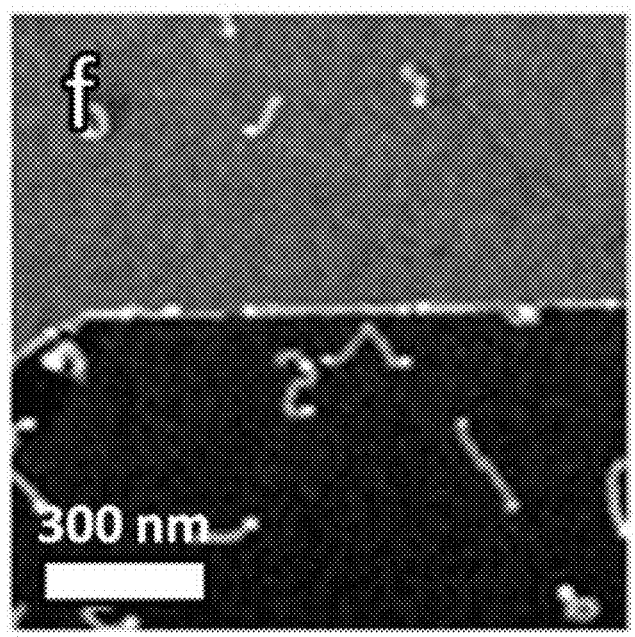
Figure 5A:
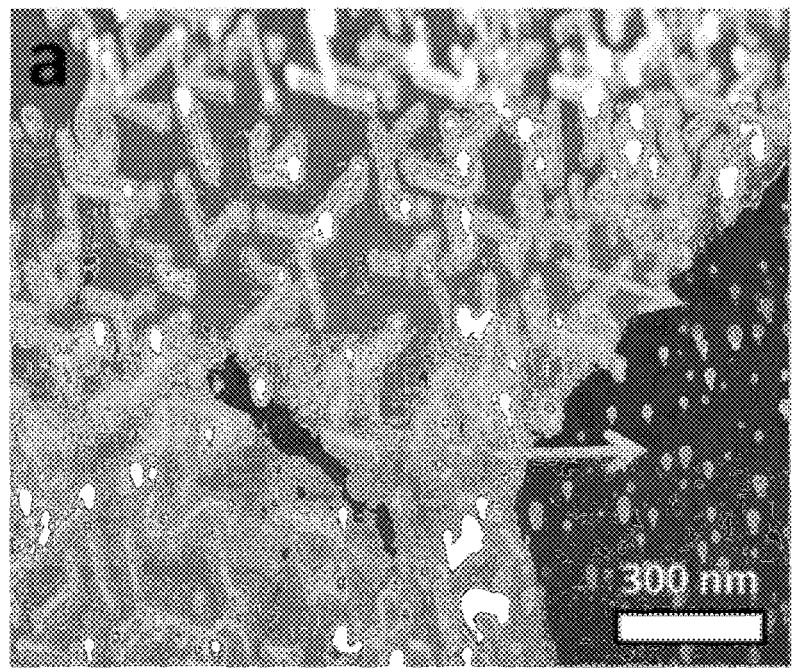
Figure 5B:
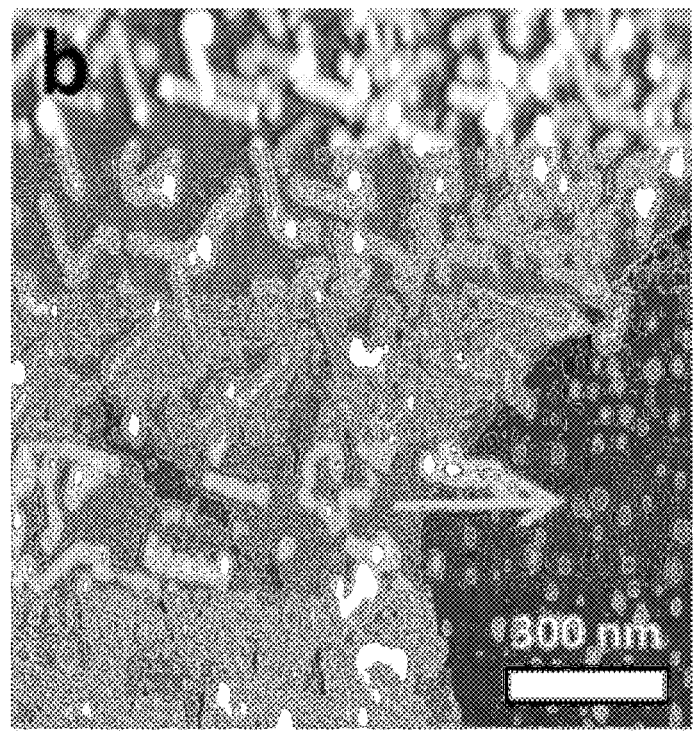
Figure 5C:
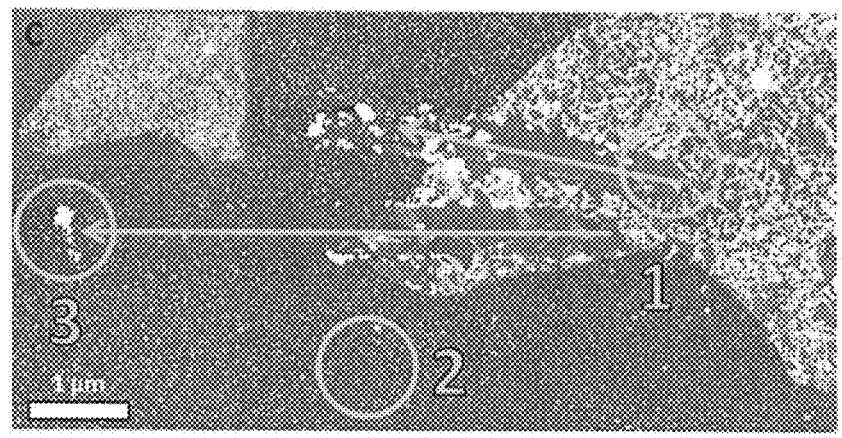
Figure 5D:
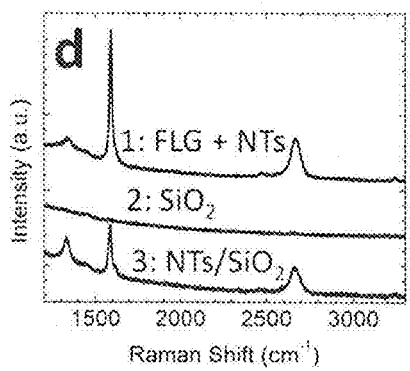
Figure 5E:
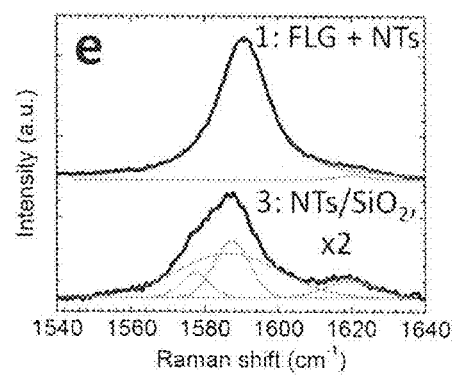
Figure 6A:
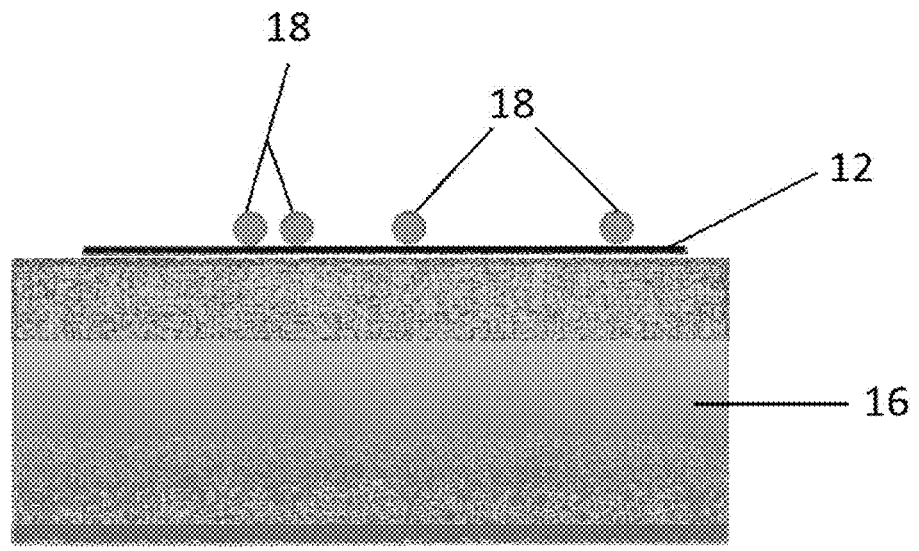
Figure 6B:
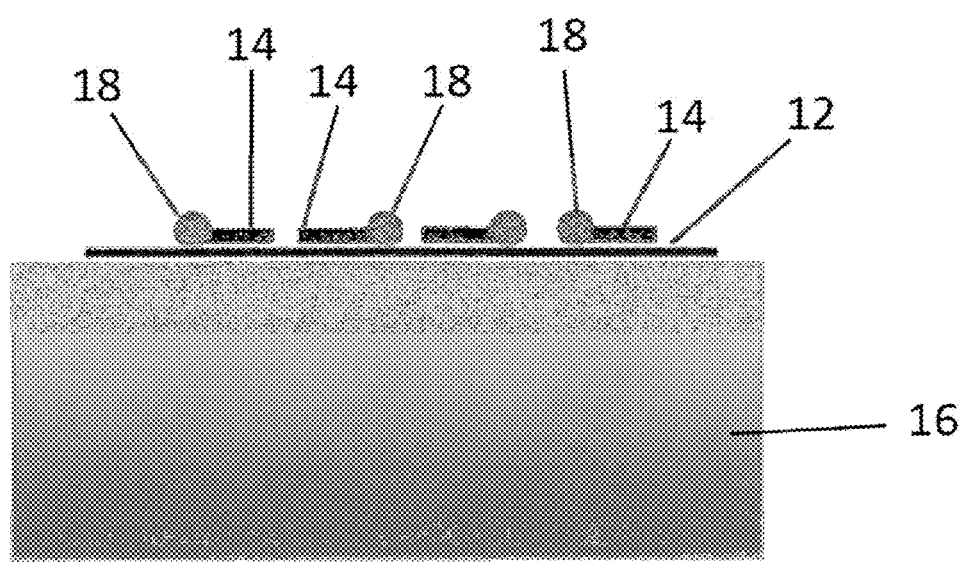
Figure 6C:
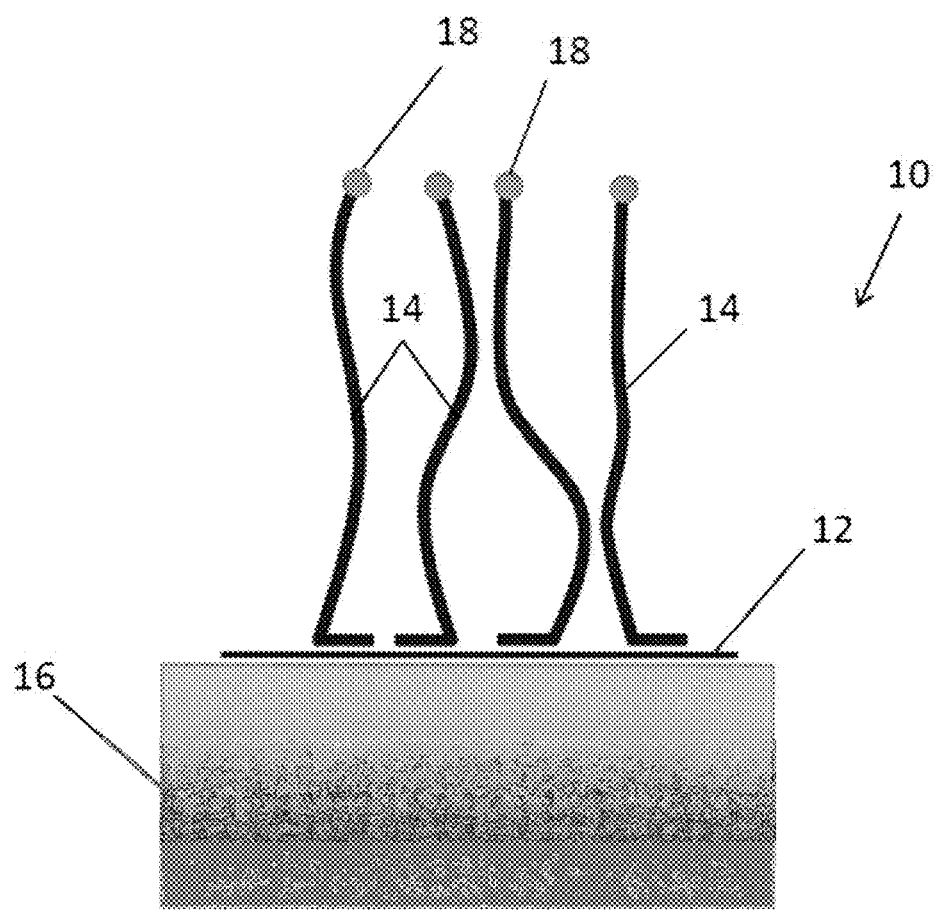

FIGS. 4a-4f are SEM images of carbon nanotubes showing abrupt changes in crystallographic orientation with FIGS. 4a and 4b showing abrupt changes in direction of carbon nanotubes on a few-layer graphene film having a thickness of approximately 0.4 nm (solid arrows pointing to carbon nanotubes that abruptly change direction to an alternate crystal axis without interaction with other nanotubes and dashed arrows pointing to nanotubes that deflect away from other nanotubes);

FIGS. 4c and 4d illustrate nanotubes caught between two parallel nanotubes that are deflected back and forth to create a zigzag-patterned nanotube appearing similar to a sequence of equilateral triangles;

FIG. 4e shows a crystallographically oriented nanotube that is etched through by a catalyst particle with the location of the etch track through the nanotube indicated by the sold arrow; and FIG. 4f shows nanotubes grown along a steep edge between two few-layer graphene regions of approximately 0.5 nm and approximately 2.5 nm in thickness;

FIG. 5a is an AFM height image of carbon nanotubes on approximately 1.1 nm thick few-layer graphene film before application of the AFM strokes represented by the arrows;

FIG. 5b is an AFM image of the same region as FIG. 5a after application of the AFM strokes showing carbon nanotubes displaced off the few-layer graphene film;

FIG. 5c is an AFM image of two regions of the same sample where approximately 10 AFM strokes have moved a large number of nanotubes in the directions of each arrow (the inset showing an AFM image of the sample before the nanotubes were moved);

FIG. 5d is a micro-Raman spectra of the three regions circled in FIG. 5c;

FIG. 5e is an expanded view of G band peaks comparing detailed signal from region containing carbon nanotubes on few-layer graphene film (region 1) to the region containing the deposited nanotubes on $SiO_2$ (region 3);

FIG. 6a is a schematical illustration of catalyst particles applied to a few-layer graphene film on a supporting substrate;

FIG. 6b is a schematical illustration of a first stage of growth of the carbon nanotubes on the few-layer graphene film illustrated in FIG. 6a; and FIG. 6c is a schematical illustration of the second stage of growing carbon nanotubes on the few-layer graphene film illustrated in FIG. 6b.

DETAILED DESCRIPTION OF THE INVENTION

The method of drawing the carbon nanotubes 14 on a few-layer graphene film 12 is best illustrated by viewing FIGS. 6a, 6b and 6c together. As illustrated in FIG. 6a, catalyst particles 18 are applied to the few-layer graphene film 12 supported on the substrate 16. The carbon nanotubes 14 are then grown on the graphene film 12 at the catalyst particles 18 in crystallographic alignment with the graphene film so that the carbon nanotubes demonstrate the three distinct histogram peaks at angles of about −60°, about 0° and about +60°.

In some embodiments, the method includes the preliminary step of cleaning the substrate 16 and applying highly ordered pyrolytic graphite to the claimed substrate. In some embodiments cleaning includes ultrasonicating the substrate 16 in a cleaning solution comprising, for example, a solvent selected from a group consisting of acetone, isopropyl alcohol, deionized water and mixtures thereof. In addition or in the alternative, the cleaning step may include subjecting the substrate 16 to UV ozone cleaning. Further, in some embodiments the step of applying highly-ordered pyrolytic graphite to the substrate includes mechanically exfoliating a few-layer graphene film 12 onto the substrate 16.

In some embodiments the step of applying catalyst particles 18 to the few-layer graphene film 12 includes using electron beam evaporation. In some embodiments the step of applying catalyst particles 18 to the few-layer graphene film 12 includes using a metal containing salt solution which is applied to the surface of the few-layer graphene film.

In some embodiments the step of growing carbon nanotubes 14 on the few-layer graphene film 12 includes using chemical vapor deposition. That chemical vapor deposition includes heating to a temperature of between 850° C. to about 950° C. This includes ramping to that temperature at a rate of about 50° C. per minute. In some embodiments an optional annealing step is performed wherein the temperature is first brought to about 500° C. for about 30-60 minutes before heating to the chemical deposition temperature of between about 850° C. to 950° C.

In some embodiments the growing of the carbon nanotubes 14 is accomplished using thermal vapor deposition with amorphous solid carbon feedstock layer. In a second embodiment the growing of carbon nanotubes is accomplished by using thermal vapor deposition with solid graphene carbon feedstock layers. In a third embodiment, the growing of carbon nanotubes is accomplished by using a thermal vapor deposition with a vapor feedstock such as $CH_4$ or $C_2H_4$. In other embodiments the growing of carbon nanotubes is accomplished by using thermal vapor deposition with graphene carbon feedstock layers.

In one particularly useful embodiment the method includes growing the carbon nanotubes 14 in two stages. In the first stage of the two stage process the carbon nanotubes 14 are grown at a first temperature of between about 850° C. to about 950° C. using a first rate of feedstock ($R_1$) of between zero and about 2500 sccm so as to promote growth in a first orientation along a surface of said few-layer graphene film 12 (note particularly FIG. 6b). In some embodiments the first stage of growth is performed for between about 10 and about 120 minutes. The longer the first stage is performed, the longer the growth of the carbon nanotubes 14 along the surface of the graphene film 12 and the greater the adhesion between the two.

The second stage of said two stage process includes growing the carbon nanotubes 14 at a second, higher temperature of between about 900° C. to about 1,100° C. using a second rate of feedstock ($R_2$) of between about zero and 2500 sccm. The second rate $R_2$ may differ from the first rate $E_1$ so as to promote faster growth in a second orientation substantially perpendicular to the surface of the few-layer graphene film (note particularly FIG. 6c). The second stage of growth may be performed for between about 1 and about 120 minutes depending upon how long one wishes to grow the nanotubes in the second orientation or direction. In any of the possible embodiments the method may also include the removing of the crystallographically aligned carbon nanotubes 14 from the few-layer graphene film 12 while maintaining the crystallographic alignment of those carbon nanotubes.

Figure 1:
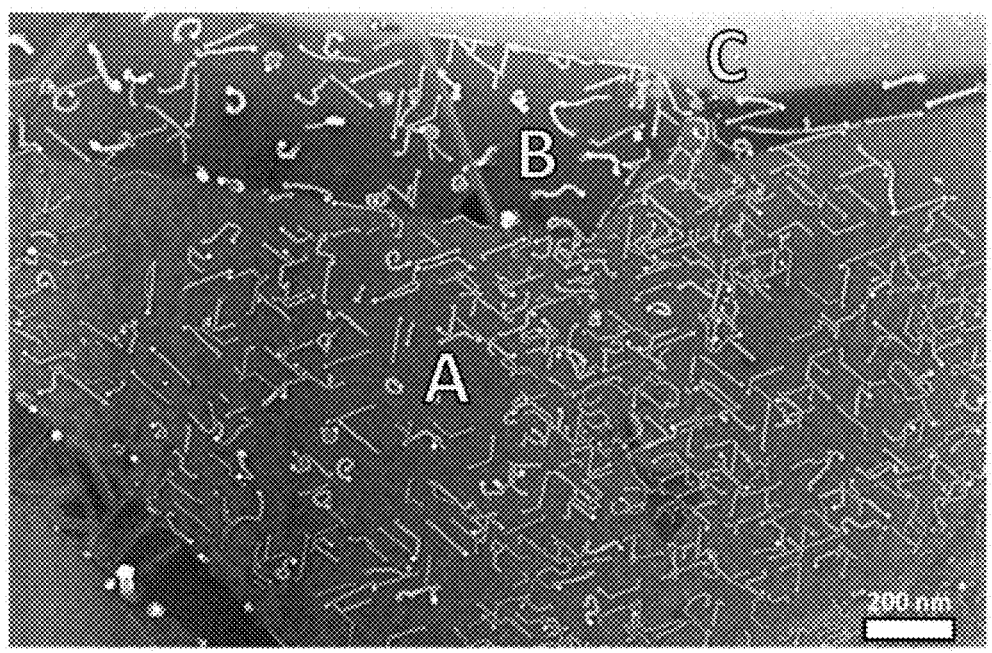
FIG. 1 is a SEM image of carbon nanotubes aligned to the crystallographic axis of a few-layer graphene film.

FIG. 1 shows a scanning electron microscopy (SEM) image of NTs grown on a FLG film ~1.0 nm thick (region "A" in the figure), as measured by atomic force microscopy (AFM). The lines in FIG. 1 are NTs which were grown at the elevated temperatures inside the CVD furnace with an Ar and H2 gas mixture without the need for a carbon feeding gas (see details in Example 1 below). Unordered NT growth on FLG without feeding gas at elevated temperatures has previously been attributed to residual carbon on the sample surface. In contrast to this previous work, our cleaning and catalyst preparation methods promote crystallographically-oriented NT growth on FLG samples. Control experiments utilizing an additional methane feedstock gas show inhibited NT growth on the FLG and long NTs only on the exposed $SiO_2$ substrate. Removal of tape scum and residue using a 400° C. furnace cleaning step prior to catalyst evaporation and using a pristine CVD quartz tube make negligible differences to the amount of NT growth, indicating that the carbon source originates from the FLG and graphite exfoliated onto the wafer. In addition, the NTs in the figure each have a single bright spot at one end, which is likely a catalyst particle. The NT diameters are in the 4 nm to 10 nm range, as determined by AFM measurements. Also evident in FIG. 1 are etch tracks formed through catalytic hydrogenation of the FLG film.

In FIG. 1, the region exhibiting the most crystallographic orientation, labeled A in the figure, is ~1.0 nm thick as measured by AFM. The thicker region, labeled B, is ~2.5 nm thick and produced fewer and less aligned NTs than region A. Region C is an exposed portion of the underlying $SiO_2$ substrate.

Figure 2A:
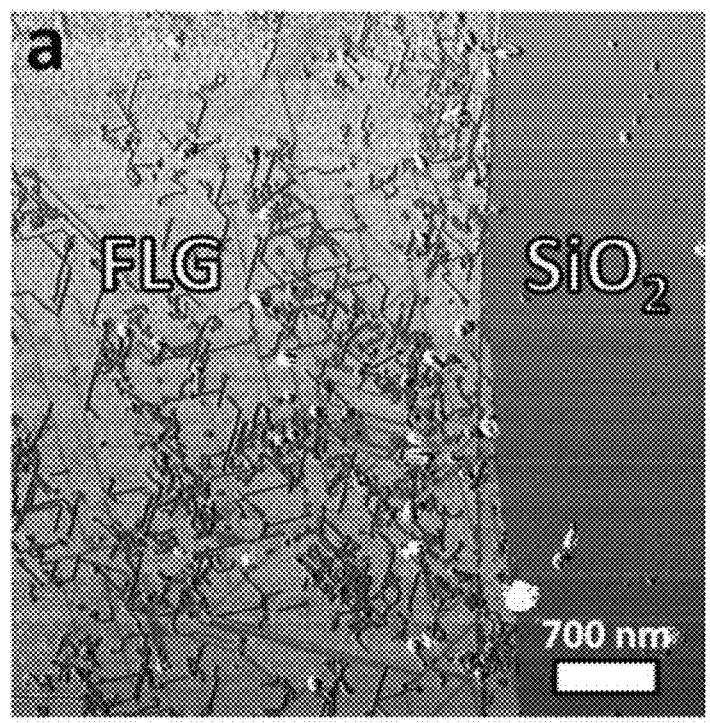
FIG. 2a is an AFM phase image of carbon nanotubes and etch tracks in graphene with the nanotubes having a higher contrast on the graphene while the etch tracks are the fainter lines.
Figure 2B:
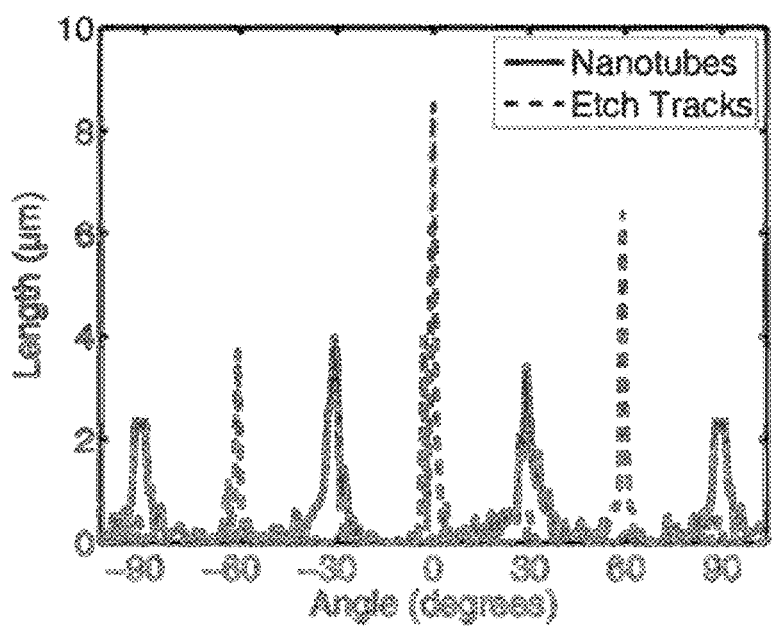
FIG. 2b is histograms generated from the AFM phase image of the total length of all nanotubes and etch tracks along a given angle with an angular bend size of 1° (Etch tracks tend to occur every 60°, as represented in the peaks in the histograms while nanotube histogram peaks are offset by 30°. Data beyond ±90° are repeated in order to clearly view the peak located at 90°)

To determine the crystallographic orientation of the NTs, we statistically analyzed their growth on a ~0.4 nm thick FLG flake (FIG. 2). This sample contains a significant number of etch tracks and NTs which permit a statistical analysis of their orientations. FIG. 2a shows an AFM phase contrast image of the sample, which serves to simultaneously determine the orientation and position of both the NTs and the etch tracks. In this phase image, NTs have a greater contrast on the graphene than the etch tracks, while the etch tracks appear as the longer, fainter lines. FIG. 2b shows histograms of the total lengths of all NTs (solid blue line) and etch tracks (dashed red line) in FIG. 2a versus angle. Each of these histograms show a series of distinct peaks at 60° intervals, with the two sets offset by 30°. Since nickel catalyst particles have long been known to etch graphite predominantly along the zigzag axes, for track widths like those in FIG. 2 which are in the majority ~10 nm or greater, we deduce that NT formation is mostly occurring along the armchair directions.

Figure 3A:
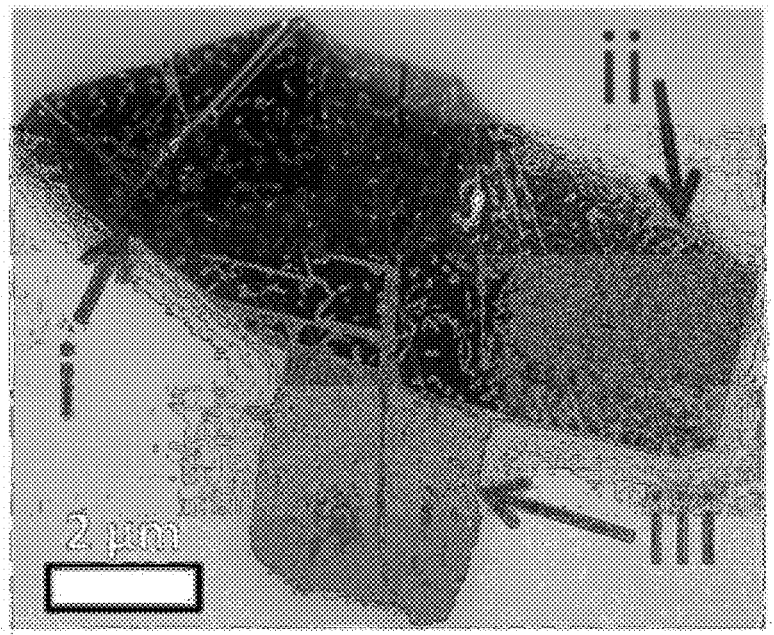
FIG. 3a is a SEM image of carbon nanotubes grown on regions of a continuous flake of few-layer graphene with thicknesses 4.7 nm (i), 1.8 nm (ii), and 0.4 nm (iii), as well as the corresponding histograms generated from the three regions showing crystallographic orientation increases as the few-layer graphene thickness decreases.
Figure 3B:
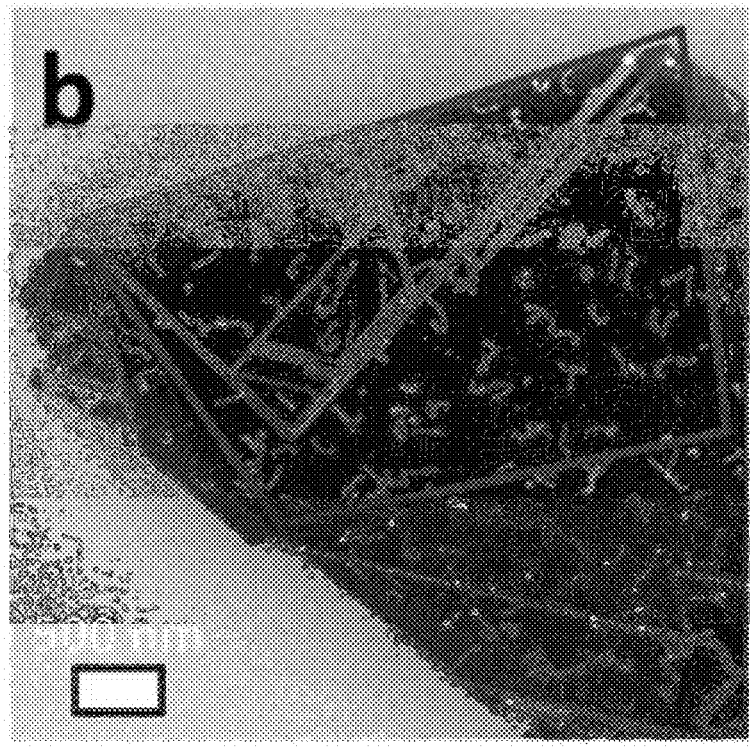
FIGS. 3b-3d are higher resolution SEM images showing details of the three locations with the regions used for the histogram analysis outlined.
Figure 3C:
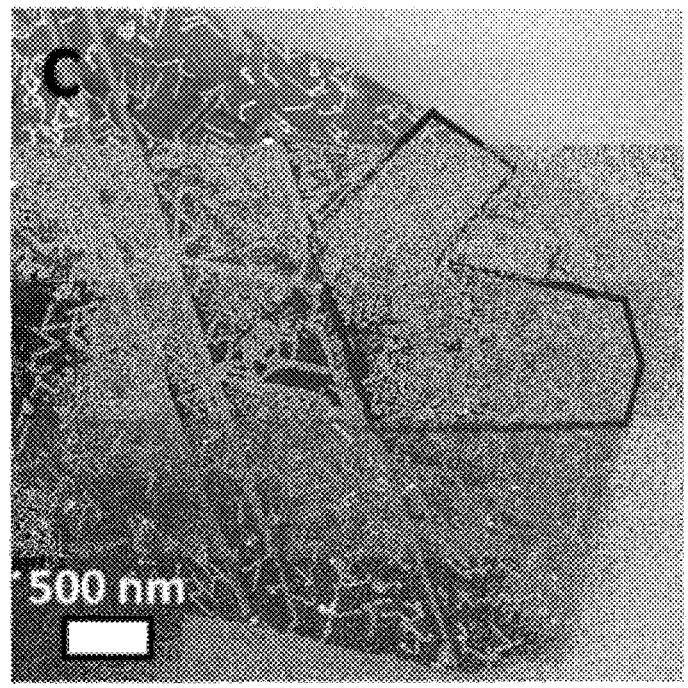
Figure 3D:
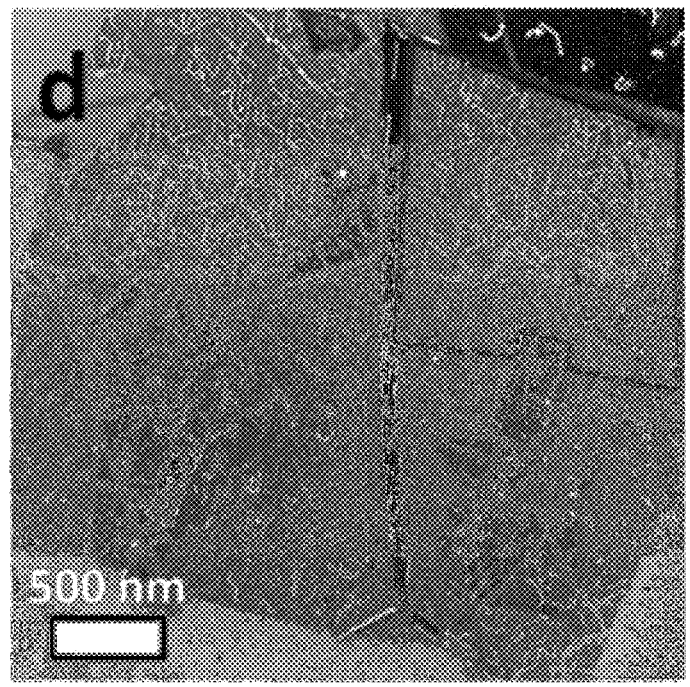

The crystallographically-oriented growth of NTs on FLG becomes less pronounced as the flake thickness increases. For FLG thicker than about five atomic layers, crystallographic orientation of CVD-grown NTs is substantially decreased. This thickness-dependent growth is illustrated by the single flake of FLG shown in FIG. 3a. This flake contains three regions that have thicknesses of 4.7 nm (i), 1.8 nm (ii), and 0.4 nm (iii). Detailed images of the FLG flake and the boundaries of the three regions (i-iii) are shown in the SEM images of FIGS. 3b-3d. The corresponding histograms of length versus angle are plotted in FIG. 3a. The size of the regions in FIGS. 3b-3d is chosen to include roughly the same amount of total NT length, in order to permit a valid statistical comparison between the three regions. Care was also taken not to select regions where NT growth may have been affected by FLG edges. The histograms in FIG. 3a show that under the same growth conditions, the NT orientation along the crystallographic axes of the FLG becomes much more pronounced for flakes less than ~6 atomic layers thick. A detailed AFM height analysis of more than 40 NTs in each of the three regions shows only a very slight change in average NT diameter for the various FLG thicknesses (from 6.2±0.7 nm for the thinnest layer to 7.9±1.6 nm for the thickest layer).

In addition to pronounced crystallographic orientation on thin FLG films, we also find that NTs grown on FLG show abrupt changes in their direction of alignment to the underlying graphene lattice, usually from one armchair direction to another. This change in orientation produces kinks of 60° and 120° in otherwise straight NTs, as seen in FIGS. 4a and 4b. Some of these abrupt changes seem to occur independently without interactions between NTs (as pointed to by the solid arrows in FIGS. 4a and 4b), while others result when one NT comes into contact with another (pointed to by the dashed arrow in FIG. 4a). The abrupt changes in direction without NT intersections may be due to interactions between the growing NT-catalyst structure and defects or impurities in the graphene or $SiO_2$ substrate.

The interaction between growing NTs on FLG can also result in intricate patterns. Examples of such patterns are shown in FIGS. 4c and 4d, where a growing NT has been bounded by two other NTs to form a crystallographic back-and-forth pattern. The formation of such a back-and-forth pattern indicates that the NTs grow through a surface-bound tip-growth mechanism, since it would be highly improbable for a fixed catalyst particle to produce such a structure precisely fitting between two other NTs, as seen in FIGS. 4b and 4c. Our results also indicate that the catalyst particles on FLG must remain very close to the surface (within a few nanometers) since NTs less than 10 nm in diameter act as effective barriers to the growth of other NTs.

We also observe that NTs do not tend to cross etch tracks. FIG. 4e shows a rare occurrence of a NT and etch track intersection, but with the NT having a cut in it. This suggests that the NT was formed first and a nanoparticle cut through it while forming an etch track at a later time. In addition, when a NT reaches a step edge between regions of differing FLG thickness, the nanotube will grow along the edge, as seen in FIG. 4f at the intersection between an ~0.5 nm and an ~2.5 nm region.

The typical bending radius we observe at the kinks of the NTs is less than the ~10 nm lateral resolution of the SEM and AFM images. This upper bound to the bending radius is extremely small compared to the ~micron scale bending radii typically observed for NTs when the growth and alignment is understood to involve the lifting up of the catalyst particle from the surface of the substrate. Such a small radius of curvature could indicate that the NTs change crystal direction abruptly rather than bend, which may have potential use in forming NT junctions. Kinked NT growth has been reported along step edges on miscut quartz and along various preferred crystallographic directions on Y-cut and Z-cut quartz substrates due to angular dependent van der Waals interactions. NT growth on Z-cut quartz shows similarity to the growth geometries we observe on FLG substrates, with NTs having abrupt changes in direction between the three preferred growth axes which are separated by 60° intervals.

The crystallographic orientation of the NTs along the armchair directions of the FLG could indicate the prevalence of zigzag-oriented NTs. The interaction energy between a carbon nanotube and a graphitic substrate is dependent on the relative orientation of their lattice structures, with the difference in interaction energy for aligned and misaligned nanotubes being on the order of 10 meV per nanometer of tube length. This interaction energy could play a role during the catalytic formation since the catalyst particle remains within several nanometers to the surface of the FLG sheet. Moreover, since the catalyst particle remains close to the FLG surface during NT growth, the interactions between the catalyst particle and the FLG could also be important in the growth of crystallographically ordered NTs.

To utilize the NTs in electronics could require their isolation on insulating substrates away from the FLG support on which they are grown. To demonstrate that these NTs could be transferred to insulating substrates we have utilized an AFM tip to drag them off of the FLG flakes and onto the nearby $SiO_2$ substrate. FIG. 5 shows the before (a) and after (b) AFM height images of NTs which have been dragged from an ~1.1 nm thick FLG to the exposed $SiO_2$ with the AFM strokes represented by the arrows. This physical transfer of the NTs shows that they are not covalently bound to the FLG surface.

FIG. 5c shows another region on the same FLG sample where ~10 adjacent strokes of an AFM tip (as indicated by the arrows) have dragged NTs completely off of the FLG and onto the nearby $SiO_2$ to two separate locations. FIG. 5d shows micro-Raman spectra taken at the three circled regions marked in FIG. 5c. The Raman measurements taken over the NTs and FLG (region 1) show three distinct peaks in FIG. 5d that correspond to the well-known D, G, and G' bands characteristic of $sp^2$ bonded carbon allotropes. Raman measurements over the clump of NTs that were dragged from the FLG and displaced over the $SiO_2$ substrate (region 3) show a similar $sp^2$ bonded carbon response, whereas a control experiment over the $SiO_2$ (region 2) shows no appreciable Raman response. These results are an indication that the NTs we observe are in fact comprised of $sp^2$ bonded carbon. Moreover, a detailed comparison of the G peaks of regions 1 and 3 shows that the shape is significantly more complex for the isolated NTs over the $SiO_2$. When the NTs are isolated away from the FLG, which contributes a large single-Lorentzian background peak (upper curve), the multi-Lorentzian peak typical of carbon NTs is revealed (lower figure).

The following Examples are presented to further illustrate two possible embodiments of the present method and apparatus but it is not to be considered as limited thereto.

EXAMPLE 1

Crystallographically ordered NT on FLG samples were prepared on p+-doped silicon substrates having a 300 nm thermal oxide layer. The substrates were ultrasonicated in acetone, isopropyl alcohol, and deionized water for 3 minutes each using a Branson 2510 Bransonic Ultrasonic Cleaner. The substrates were then subjected to UV ozone (UVO) cleaning for 15 minutes in a NovaScan PSD Series Digital UV Ozone System. Highly-ordered pyrolytic graphite (HOPG) was then mechanically exfoliated onto the substrates. Catalyst material was deposited onto the substrate using electron-beam evaporation of a nominally 0.2 angstrom thick film of Ni to form catalyst particles. Samples were then placed in a chemical vapor deposition (CVD) furnace (Thermo Scientific Lindberg Model TF55035C) with a gas flow of 850 and 150 sccm of Ar and $H_2$ (determined with MKS Mass-Flo Controllers with MKS Type 247D Four-Channel Readout), respectively, where they were annealed at 500° C. for 30-60 min and then immediately heated to 900° C. for 60 min in order to grow the NTs. Temperatures were achieved in both steps using a controlled ramp rate of 50° C. per min. Immediately following the growth period, the samples were allowed to cool to room temperature.

Control experiments were performed in the slightly modified (from above) gas flows of 700 sccm Ar and 150 sccm $H_2$ in order to determine the effects of a 2,500 sccm $CH_4$ feedstock gas. Two sets of control samples were prepared; with and without an additional tape-scum removing step performed prior to Ni evaporation. The tape-scum removal was performed in the CVD system at 400° C. for 1 hour with a gas mixture of 340 sccm Ar and 380 sccm of $H_2$.

AFM height measurement, imaging, and nanomanipulation were performed with an Asylum Research MFP-3d AFM. AFM height measurement and imaging were performed in intermittent contact mode. Nanomanipulation of NTs was performed in contact mode using the Asylum Research MicroAngelo™ nanolithography and nanomanipulation package.

SEM imaging was performed with a Zeiss Supra 35 field-emission SEM with a Gemini Column.

Raman spectroscopy measurements were performed with a Renishaw 100 confocal micro-Raman system with a CCD detector, 633 nm excitation of HeNe laser was focused to ~1 µm spot size with a 100× objective. Spectra were acquired using a 60 second integration time.

Histogram analysis was performed by first digitizing the locations of NTs and/or etch tracks with the use of a MatLab code we developed. This code allows us to trace over a digital image of NTs and etch tracks with a series of short straight lines down to approximately 1 nm in length. The code stores a length and direction for each line within an analyzed region. Histograms, as in FIG. 2b, are generated by summing the total length for all the lines that fall within a specific angular bin.

EXAMPLE 2

Results of second stage growth parameters yielded nanotubes substantially perpendicular and away from the FLG substrate. The growth is performed at elevated temperatures of between 1,050° C. and 1,100° C. without vapor feedstock, which is greater than the temperatures used to form the crystallographically aligned nanotubes on FLG surfaces. A top-down view of such a sample shows the nanotubes that grow substantially perpendicular to the surface. A side view shows the nanotubes clearly grow off of the surface of the substrate. This substantially perpendicular growth can be used as the second stage of the two-stage process schematically represented in FIGS. 6a-6c.

In summary, numerous benefits result from employing the concepts disclosed in this document. The presently disclosed apparatus and method provide for improved crystallographic control over the construction, orientation and placement of carbon nanotubes which should significantly enhance their potential for nanoscale applications. Advantageously, carbon nanotubes 14 grown by the two stage process disclosed are strongly tethered to the few-layer graphene film 12. This is because the crystallographic alignment enhances the Van Der Waals interaction and permits very good electrical and thermal contact between the nanotubes and the few-layer graphene sheet. Such structures are potentially useful for a number of applications including but not limited to for fuel cell or battery electrodes and super capacitor electrodes. These applications all require two important aspects (1) large surface area electrodes, which the nanotubes provide (due to high density and surface-volume ratio) and (2) good electrical conductivity throughout the electrode. The good electrical conductivity is obtained through the crystallographically aligned nanotube-graphene interface. Van der Waals coupled electrical interfaces between carbon nanotubes and graphene are well known to strongly depend on their crystallographic orientation.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A thermal and electrical conducting apparatus, comprising:
   a few layer graphene film having a thickness of 6 atomic layers or less;
   a substrate supporting the few layer graphene film; and
   a plurality of carbon nanotubes crystallographically aligned with said few-layer graphene film along armchair directions of the few layer graphene lattice, wherein said plurality of carbon nanotubes further comprises out of plane growth perpendicular to the few layer graphene film.

2. The apparatus of claim 1, wherein said substrate is made from an insulator.

3. The apparatus of claim 1, wherein said substrate is made from metal.

4. The apparatus of claim 1, wherein said substrate is made from a material selected from a group consisting of $SiO_2$, $Al_2O_3$, $Si_3N_4$, BN, $HfSiO_4$, $ZrSiO_4$, $HfO_2$, $ZrO_2$ and mixtures thereof.

5. The apparatus of claim 1, wherein said substrate is made from a material selected from a group consisting of Ni, Cu, Pt, Au, Co, Fe and mixtures thereof.

6. The apparatus of claim 1, wherein said few-layer graphene film has a thickness D, where $D \leq 1.0$ nm.

7. The apparatus of claim 1, wherein said carbon nanotubes demonstrate three distinct histogram peaks at angles of $-60°$, about $0°$ and about $+60°$ in relation to any of the peaks.

* * * * *